(12) United States Patent
Jung

(10) Patent No.: US 10,203,050 B2
(45) Date of Patent: Feb. 12, 2019

(54) BRACKET FOR FIXING REDUCER IN FIRE SPRINKLER

(71) Applicant: SEUNGJIN IND. CO., LTD., Gyeonggi-do (KR)

(72) Inventor: Woon Taek Jung, Gyeonggi-do (KR)

(73) Assignee: Seungjin Ind. Co., LTD (KR)

( * ) Notice: Subject to any disclaimer, the term of this patent is extended or adjusted under 35 U.S.C. 154(b) by 0 days.

(21) Appl. No.: 15/672,806

(22) Filed: Aug. 9, 2017

(65) Prior Publication Data
US 2018/0259094 A1   Sep. 13, 2018

(30) Foreign Application Priority Data

Mar. 9, 2017 (KR) .................. 10-2017-0030050

(51) Int. Cl.
| F16L 3/00 | (2006.01) |
| F16L 3/12 | (2006.01) |
| E04B 9/00 | (2006.01) |
| A62C 35/68 | (2006.01) |

(52) U.S. Cl.
CPC ............ *F16L 3/1215* (2013.01); *E04B 9/006* (2013.01); *F16L 3/003* (2013.01); *A62C 35/68* (2013.01)

(58) Field of Classification Search
CPC ......... F16L 3/1215; F16L 3/003; E04B 9/006; A62C 35/68
See application file for complete search history.

(56) References Cited

U.S. PATENT DOCUMENTS

| 4,272,871 A * | 6/1981 | Weinhold ............... F16L 23/06 24/270 |
| 7,735,787 B2 * | 6/2010 | Kafenshtok ............. E04B 9/001 169/37 |
| 7,845,599 B2 * | 12/2010 | Jackson ................. A62C 35/68 169/37 |
| 8,109,482 B2 * | 2/2012 | Oh ......................... A62C 35/68 248/342 |
| 8,272,615 B2 * | 9/2012 | Silcox .................... A62C 35/68 248/342 |
| 8,500,079 B2 * | 8/2013 | Oh ......................... A62C 35/68 239/283 |
| 9,174,077 B2 * | 11/2015 | Lim ....................... A62C 35/68 |
| 9,341,286 B1 * | 5/2016 | Oh ......................... E04B 9/006 |
| 2014/0360737 A1 * | 12/2014 | Kim ....................... F16L 3/00 169/51 |
| 2015/0360064 A1 * | 12/2015 | Jung ..................... A62C 35/68 248/75 |

* cited by examiner

*Primary Examiner* — Anita M King
(74) *Attorney, Agent, or Firm* — Mendelsohn Dunleavy, P.C.

(57) ABSTRACT

Disclosed is a bracket for fixing a reducer in a fire sprinkler, the bracket including: a main body part provided with a cutaway seat for allowing the reducer to be seated therein; and a coupling part openably coupled with the main body part, formed with a groove at a side thereof to lock the reducer seated in the cutaway seat of the main body part, and configured to lock and release the reducer seated in the cutaway seat of the main body part by being opened and closed, wherein an edge of the cutaway seat of the main body part is provided with a main body part wing to increase a contact area with the reducer seated in the cutaway seat, and an edge of the groove of the coupling part is provided with a coupling part wing to increase the contact area with the reducer.

13 Claims, 11 Drawing Sheets

BRACKET FOR FIXING REDUCER IN FIRE SPRINKLER

CROSS REFERENCE TO RELATED APPLICATION

The present application claims priority to Korean Patent Application No. 10-2017-0030050, filed on Mar. 9, 2017, the entire contents of which is incorporated herein for all purposes by this reference.

BACKGROUND OF THE INVENTION

Field of the Invention

The present invention relates generally to a bracket for fixing a reducer in a fire sprinkler. More particularly, the present invention relates to a bracket for fixing a reducer in a fire sprinkler, which is configured such that the reducer is fixed by a one-touch fixing mechanism such as a hook, and a wing capable of increasing a contact area with the reducer is provided, thereby stably fixing the reducer.

Description of the Related Art

Today, as buildings have become taller and larger, a sprinkler that can suppress a fire when a fire occurs in the building is mandatory in the building. The sprinkler usually sprinkles water by being supplied with high-pressure water from the ceiling of a building.

In order to install the sprinkler, a main water supply pipe supplies water to connection pipe inside of the ceiling, and a plurality of branch water supply pipes connect to a plurality of sprinklers. Flexible tubes made of a metal material are widely used to connect the branch water pipes to the sprinklers to supply the water.

The flexible tube is configured such that an outer circumferential surface thereof is corrugated to be flexibly bent, and the flexible tube is used by firmly fixing an O-ring and a fastening ring at a junction between the flexible tube and the branch water supply pipe to prevent the pipe from being damaged due to the pressure when water flows at high pressure therethrough. The flexible tube is configured such that a first end thereof is coupled to the branch water supply pipe and a second end thereof is connected to a connector referred to as a reducer, to which the sprinkler is fixed. Further, a number of fixing members are used to fix the reducer. A bolt is mainly used as a fixing member, which causes the reducer and other structures to be damaged by the bolt tightening pressure. As a result, this damage causes the tightening pressure of the bolt to be lowered and the safety of the product is deteriorated. Further, the conventional fixing member is problematic in that since the bolt should unscrewed or tightened when the fixing member is separated from the reducer or re-coupled to the reducer as the reducer is replaced or moved, it is cumbersome to work with and inconvenient to use. The conventional fixing member is further problematic in that a difficult situation occurs when the fastening state is loosened due to the loosening of the bolt or the bolt is lost.

Meanwhile, "Fixing bracket of sprinkler" is disclosed in Korean Patent No. 10-1603863 (Patent Document 1) to improve the conventional fixing member, wherein the fixing bracket of sprinkler, in which the fixing bracket fixes a reducer to a bar placed to cross two channels, includes: a body part having a cutaway seat with the reducer being mounted therein; and a coupling part coupled to the body part and rotated at a side of the body part based on a hinge shaft to open and close the cutaway seat, wherein the body part includes a pair of walls facing each other and each provided with a cutaway seat at a side thereof, and a locking groove formed on each of the walls; and the coupling part includes a cover, a locking member rotatably coupled to the cover and engaged with the locking groove, an elastic member proving torque to the coupling part when opening the cutaway seat, and a coupling elastic member pressing the locking member such that the locking member is engaged with the locking groove.

In the case of Patent Document 1 described above, since the mechanism for fixing the reducer is not a conventional bolt tightening type, but a one-touch fixing mechanism such as a hook, it is possible to facilitate locking and separation of the reducer, and further, it is possible to enhance the locking force. Further, a separate tool is not required to lock and separate the reducer, and it is possible to prevent problems occurring when the bolt is loosened or lost. However, in the case of Patent Document 1, the mechanism for fixing the reducer is configured such that an inscribed end of the cutaway seat 115 of the body part 110 constituting a main body of the fixing bracket 100 and an inscribed end of a groove of the cover 130 openably coupled to the body part 110 are respectively brought into contact with the reducer, thereby fixing the reducer by pressing the reducer. Accordingly, a contact area between the body part 110 of the fixing bracket 100 and the cover 130 with the surface of the reducer is not large, and thereby, a sufficient frictional force for stably fixing the reducer may not be generated. As a result, the reducer fixed by the fixing bracket 100 may be rotated depending on the situation (in other words, may be moved), whereby it is impossible to stably and firmly fix the reducer.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a bracket for fixing a reducer in a fire sprinkler, in which the reducer is fixed through not a bolt tightening type, but one-touch fixing mechanism such as a hook, it is easy to couple and release the reducer by taking measures to increase the contact area with the reducer, and it is possible to stably and firmly fix the reducer by obtaining a sufficient frictional force against the contact area with the reducer.

In order to achieve the above object, according to one aspect of the present invention, there is provided a bracket for fixing a reducer in a fire sprinkler, the reducer being provided at an end of a flexible tube of the fire sprinkler, the bracket including: a main body part provided with a cutaway seat for allowing the reducer to be seated therein; and a coupling part openably coupled with the main body part, formed with a groove at a side thereof to lock the reducer seated in the cutaway seat of the main body part, and configured to lock and release the reducer seated in the cutaway seat of the main body part by being opened and closed, wherein an edge of the cutaway seat of the main body part is provided with a main body part wing to increase a contact area with the reducer seated in the cutaway seat, and an edge of the groove of the coupling part is provided with a coupling part wing to increase the contact area with the reducer.

Herein, the main body part wing may be configured such that an end portion thereof is bent to be inclined at a predetermined angle.

Here, the main body part wing may be bent to be inclined at the predetermined angle, and may be constituted by a pair of wings symmetrically provided to face each other.

Further, the bracket may further include a third wing provided between the pair of wings symmetrically provided to face each other to increase the contact area with the reducer.

Further, the main body part may be provided with a stop groove at a predetermined portion thereof to allow the coupling part to be coupled therewith and released therefrom.

Further, the coupling part may include: a first coupling member rotatably coupled to a side of the main body part by a hinge shaft; and a second coupling member rotatably coupled to a side of the first coupling member by a hinge shaft.

Further, the second coupling member may be provided with a coupling means to be engaged with or released from the stop groove of the main body part.

Here, the coupling means may be in a form of a steel wire spring.

Here, the coupling means may be in a form of a steel leaf spring.

Further, the coupling part may include: a first coupling member rotatably coupled to a side of the main body part by a hinge shaft; a second coupling member rotatably coupled to a side of the first coupling member by a hinge shaft; and an elastic member provided throughout the first coupling member and the second coupling member, and configured to provide an elastic force such that the first and second coupling members are coupled with and released from the main body part by a simple touch.

Here, the elastic member may be in a form of a leaf spring.

According to the present invention having the above-described characteristics, it is advantageous in that the mechanism for fixing the reducer is not a bolt tightening type, but one-touch fixing mechanism such as a hook. Thus, it is easy to couple and release the reducer by taking measures to increase the contact area with the reducer, and it is possible to stably and firmly fix the reducer by obtaining a sufficient frictional force against the contact area with the reducer.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The terminology used herein is for the purpose of describing particular aspects (or embodiments) only and is not intended to be limiting of the present invention.

It will be understood that the terms "comprise", "include", "have", etc. throughout the specification, specify the presence of stated features, integers, steps, operations, elements, components, and/or combinations of them but do not preclude the presence or addition of one or more other features, integers, steps, operations, elements, components, and/or combinations thereof, unless otherwise noted. Further, the term 'module' or 'unit' used herein means a functional part performing at least one function or action, which may be realized with hardware or software, or a combination of hardware and software.

Reference will be made in detail to exemplary embodiments of the invention with reference to the accompanying drawings, hereinbelow.

Here, before describing the embodiments of the present invention in full, a sprinkler system installed in a general building and a reducer fixing apparatus will be described first.

Figure 1:
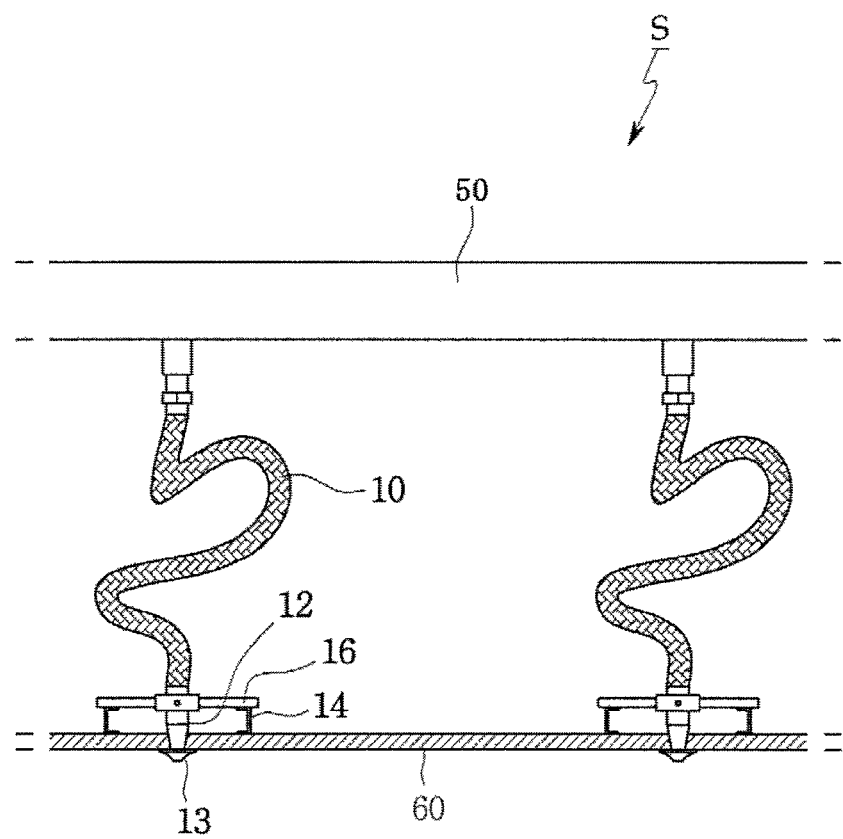
FIG. 1 is a view showing an example of a sprinkler system installed in a general building.

FIG. 1 is a view showing an example of a sprinkler system installed in a general building.

As shown in FIG. 1, a sprinkler S is configured such that a flexible tube 10 is branched from a main pipe 50 from which fire water is supplied, and a reducer 12 is coupled to a lower end of the flexible tube 10. Further, a head 13 is coupled to a lower end of the reducer 12, and the head 13 is fixedly inserted into a through-hole formed through a ceiling texture 60. The flexible tube 10, the reducer 12, and the head 13 are collectively referred to as a sprinkler joint. Reference numerals 14 and 16 in FIG. 1 designate a channel and a quadrangular bar, respectively.

Figure 2:
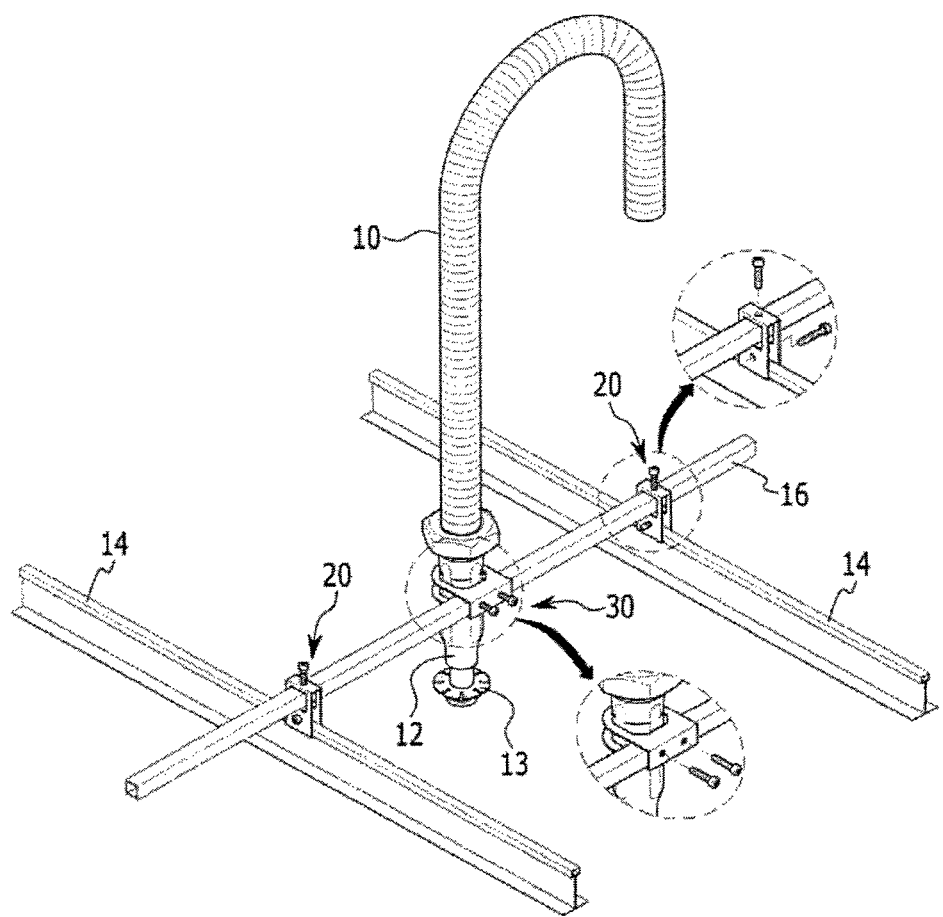
FIG. 2 is a view specifically showing the sprinkler of FIG. 1.

FIG. 2 is a view specifically showing the sprinkler of FIG. 1.

As shown in FIG. 2, the sprinkler is installed in such a manner that a quadrangular bar 16 is placed on a pair of channels 14 that are arranged to be spaced from each other at a predetermined interval such that they intersect at right angles, and then the bar is fastened to each channel 14 by using a side bracket 20 by bolt tightening. Further, the reducer 12, the flexible tube 10, and the head 13 are fixed to the quadrangular bar 16 by using a fixing bracket 30 for a reducer by bolt tightening.

Herein, if the side bracket 20 is coupled to the channel 14 by using only a bolt, the bolt is brought into direct contact with the channel 14, whereby a contact area between the bolt and the channel 14 is small, so a coupling force may be reduced. Further, a separate tool is required for a user to tighten and release the bolt, and installation work is inconvenient due to separation and loss of the bolt when moving. Likewise, if the fixing bracket 30 for a reducer fixes the reducer 12 by using only a bolt, the bolt is brought into direct contact with the quadrangular bar 16, whereby a contact area between the bolt and the quadrangular bar 16 is reduced, so a coupling force may be reduced.

The present invention has been made keeping in mind the above situations (problems), and reference will now be made to exemplary embodiments of the invention.

Figure 3:
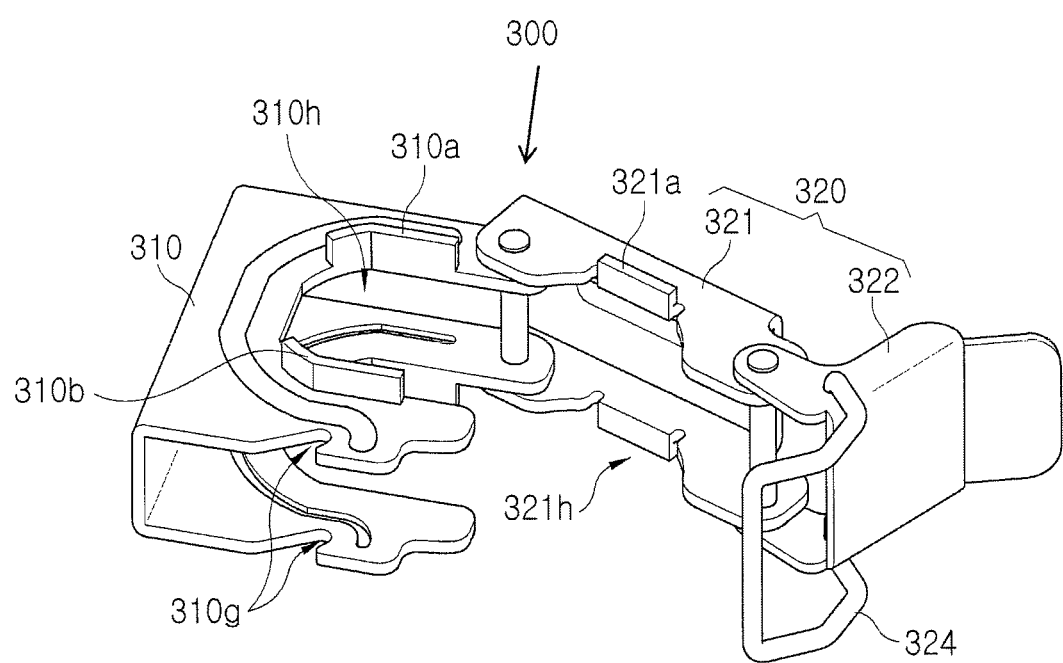
FIG. 3 is a view showing a state where a coupling part of a bracket for fixing a reducer in a fire sprinkler according to a first embodiment of the present invention is opened.
Figure 4:
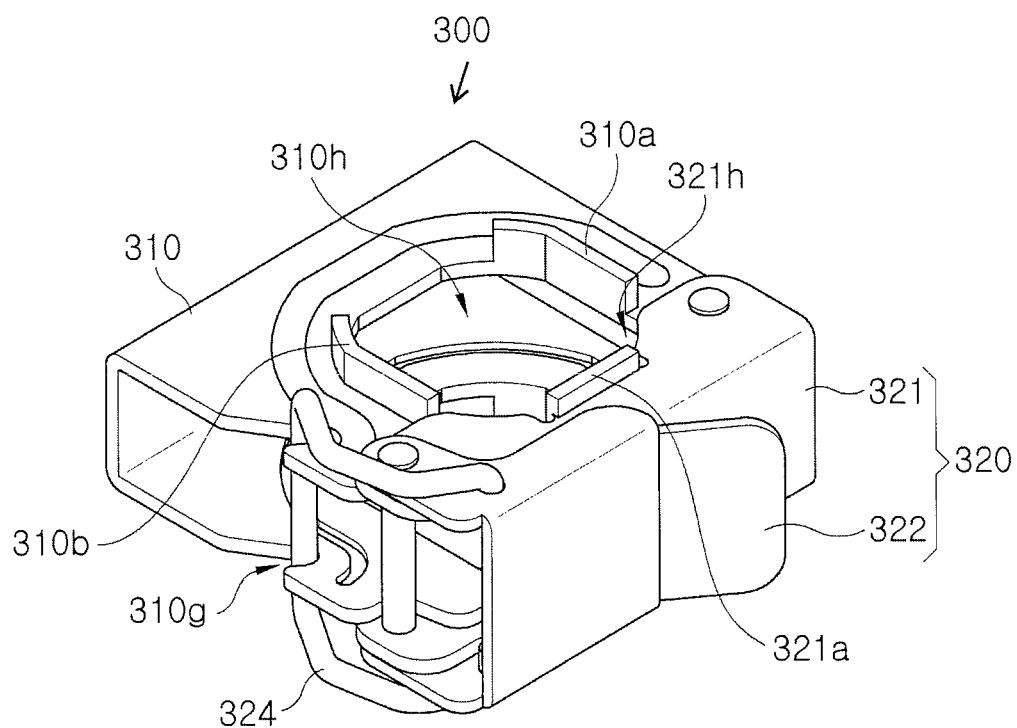
FIG. 4 is a view showing a state where the coupling part of the bracket for fixing a reducer in a fire sprinkler according to the first embodiment of the present invention is closed.
Figure 5:
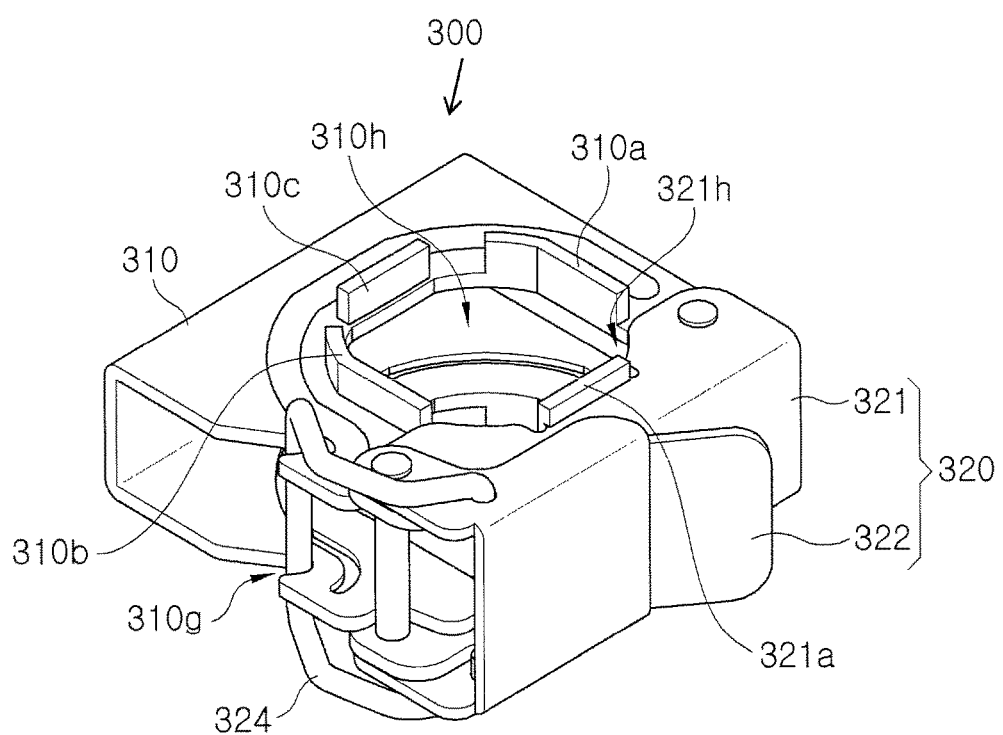
FIG. 5 is a view showing a state where a third wing is additionally provided in a main body part of the bracket for fixing a reducer in a fire sprinkler according to the first embodiment of the present invention.
Figure 6:
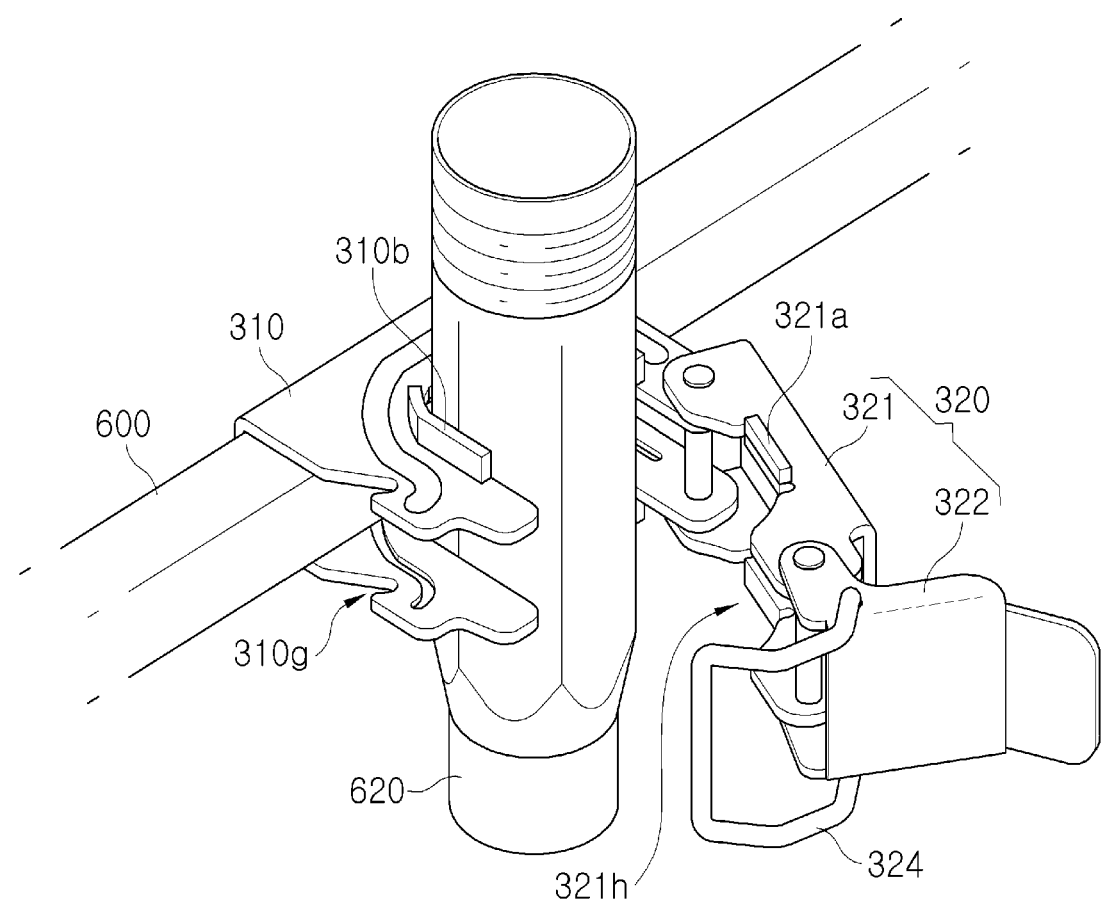
FIG. 6 is a view showing a state where the coupling part is opened in a state where a reducer is seated in the bracket for fixing a reducer in a fire sprinkler according to the first embodiment of the present invention.
Figure 7:
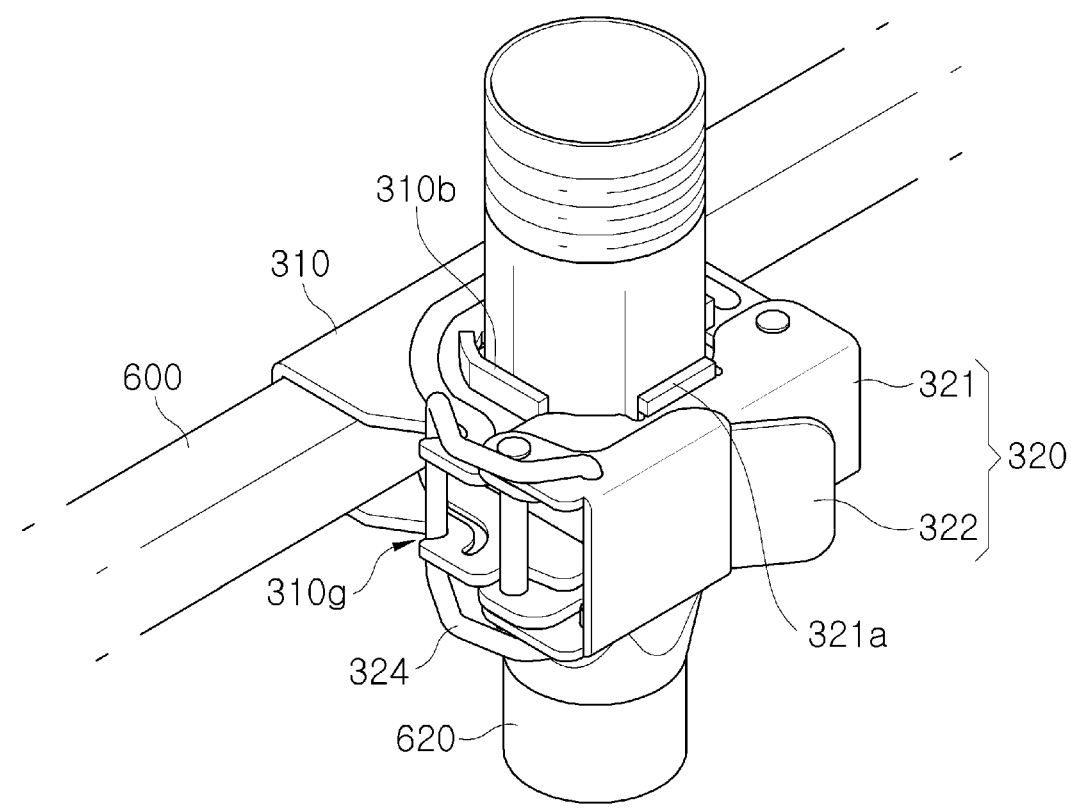
FIG. 7 is a view showing a state where the coupling part is closed in a state where the reducer is seated in the bracket for fixing a reducer in a fire sprinkler according to the first embodiment of the present invention.

FIGS. 3 to 7 show a bracket for fixing a reducer in a fire sprinkler according to a first embodiment of the present invention, wherein FIG. 3 is a view showing a state where a coupling part of the bracket is opened; FIG. 4 is a view showing a state where the coupling part of the bracket is closed; FIG. 5 is a view showing a state where a third wing is additionally provided in a main body part; FIG. 6 is a view showing a state where the coupling part is opened in a state where a reducer is seated in the bracket; and FIG. 7 is a view showing a state where the coupling part is closed in a state where the reducer is seated in the bracket.

Referring to FIGS. 3 to 7, a bracket 300 for fixing a reducer in a fire sprinkler according to the first embodiment of the present invention is a bracket for fixing a reducer provided to an end of a flexible tube of the fire sprinkler, and includes a main body part 310 and a coupling part 320.

As shown in the drawings, the main body part 310 is formed in a double symmetric structure by cutting and bending a steel plate having a predetermined thickness to be roughly ⊂ shaped, wherein the main body part 310 is formed with a U shaped cutaway seat 310h for allowing a reducer 620 (see FIG. 6) to be seated therein.

Further, an edge of the cutaway seat 310h of the main body part 310 is formed with main body part wings 310a and 310b for increasing a contact area with the reducer 620 seated in the cutaway seat 310h. Herein, it is preferred that an end portion of each of the main body part wings 310a and 310b be bent to be inclined at a predetermined angle, as shown in the drawings. Herein, the reason for bending the wings is to stably hold the reducer 620 seated in the seat hole 310h, even if the reducer is a polygonal pipe (for example, a quadrangular pipe, a pentagonal pipe, a hexagonal pipe, an octagonal pipe, etc.).

Here, the main body part wings 310a and 310b are configured to be bent to be inclined at a predetermined angle, and the pair of wings 310a and 310b is symmetrically provided to face each other. Further, as shown in FIG. 5, a third wing 310c may be provided between the pair of wings 310a and 310b symmetrically provided to face each other, in order to increase the contact area with the reducer 620.

Further, a predetermined portion of the main body part 310 is provided with a stop groove 310g to allow the coupling part 320 to be coupled therewith and released therefrom.

The coupling part 320 is openably coupled with the main body part 310, is formed with a groove 321h at a side thereof to lock the reducer 620 seated in the cutaway seat 310h of the main body part 310, and is configured to lock and release the reducer 620 seated in the cutaway seat 310h of the main body part by being opened and closed.

The groove 321h of the coupling part 320 is provided with a coupling part wing 321a at an edge thereof in order to increase the contact area with the reducer 620.

Further, the coupling part 320 may include: a first coupling member 321 rotatably coupled to a side of the main body part 310 by a hinge shaft; and a second coupling member 322 rotatably coupled to a side of the first coupling member 321 by a hinge shaft.

Further, the second coupling member 322 is provided with a coupling means 324 to be engaged with or released from the stop groove 310g of the main body part 310. Here, the coupling means 324 may be constituted by a steel wire spring. Reference numeral 600 in FIGS. 6 and 7 designates a quadrangular bar for supporting and fixing the main body part 310 of the bracket.

Figure 8:
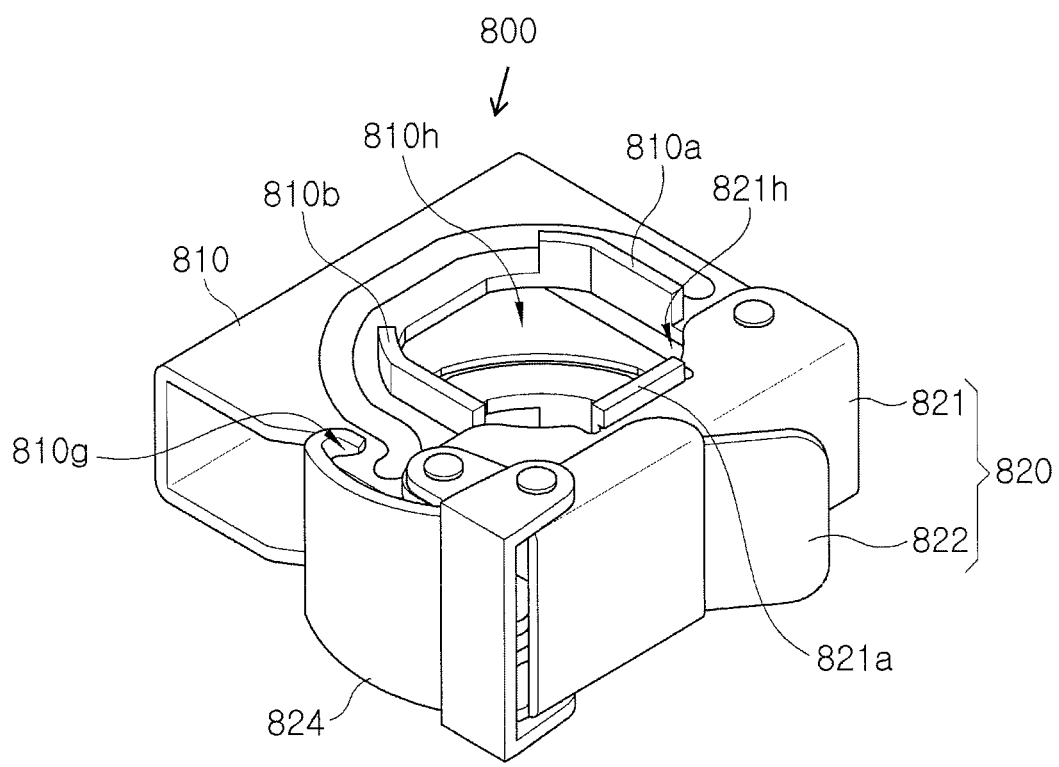
FIG. 8 is a view showing a bracket for fixing a reducer in a fire sprinkler according to a second embodiment of the present invention.

Meanwhile, FIG. 8 is a view showing a bracket for fixing a reducer in a fire sprinkler according to a second embodiment of the present invention.

Referring to FIG. 8, there is shown a bracket 800 for fixing a reducer in a fire sprinkler according to the second embodiment of the present invention, and the basic structure thereof is the same as the bracket 300 for fixing a reducer in a fire sprinkler according to the first embodiment of the present invention, which is described hereinbefore. However, there is a slight difference in the coupling means provided in the coupling part.

Accordingly, in describing the bracket 800 according to the second embodiment, the description of the same parts as the bracket 300 according to the first embodiment will be omitted, and only different parts will be described.

In other words, the bracket 300 according to the first embodiment is configured such that the coupling means 324 is constituted by the steel wire spring, and on the contrary, the bracket 800 according to the second embodiment is configured such that a coupling means 824 is constituted by a steel leaf spring.

Figure 9:
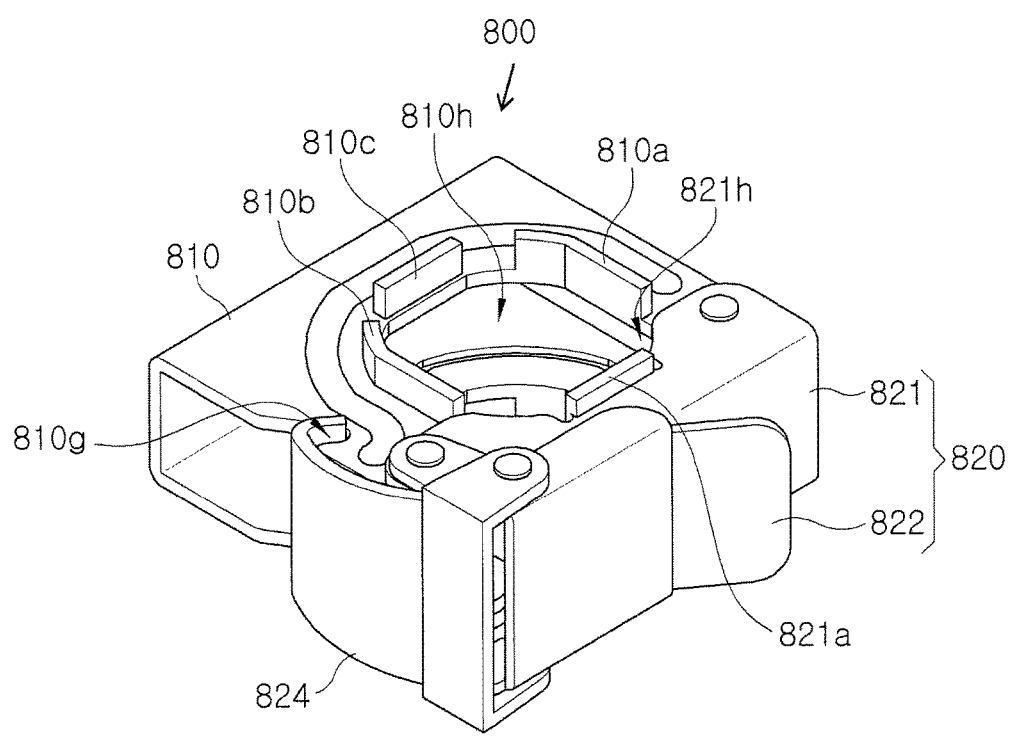
FIG. 9 is a view showing a state where a third wing is additionally provided between a pair of main body part wings symmetrical with each other in the bracket shown in FIG. 8.

FIG. 9 is a view showing a state where a third wing is additionally provided between a pair of symmetric main body part wings in the bracket shown in FIG. 8.

As shown in FIG. 9, in the case of the bracket 800 according to the second embodiment, as in the case of the bracket 300 according to the first embodiment, a third wing 810c may be additionally provided between a pair of symmetric main body part wings 810a and 810b, in order to increase a contact area with the reducer 620 (see FIG. 6) seated in a cutaway seat 810h. Reference numerals 810, 810g, 820, 821, 822, 821a, and 821h in FIGS. 8 and 9 designate a main body part, a stop groove, a coupling part, a first coupling member, a second coupling member, a coupling part wing, a groove for fixing the reducer, respectively.

Figure 10:
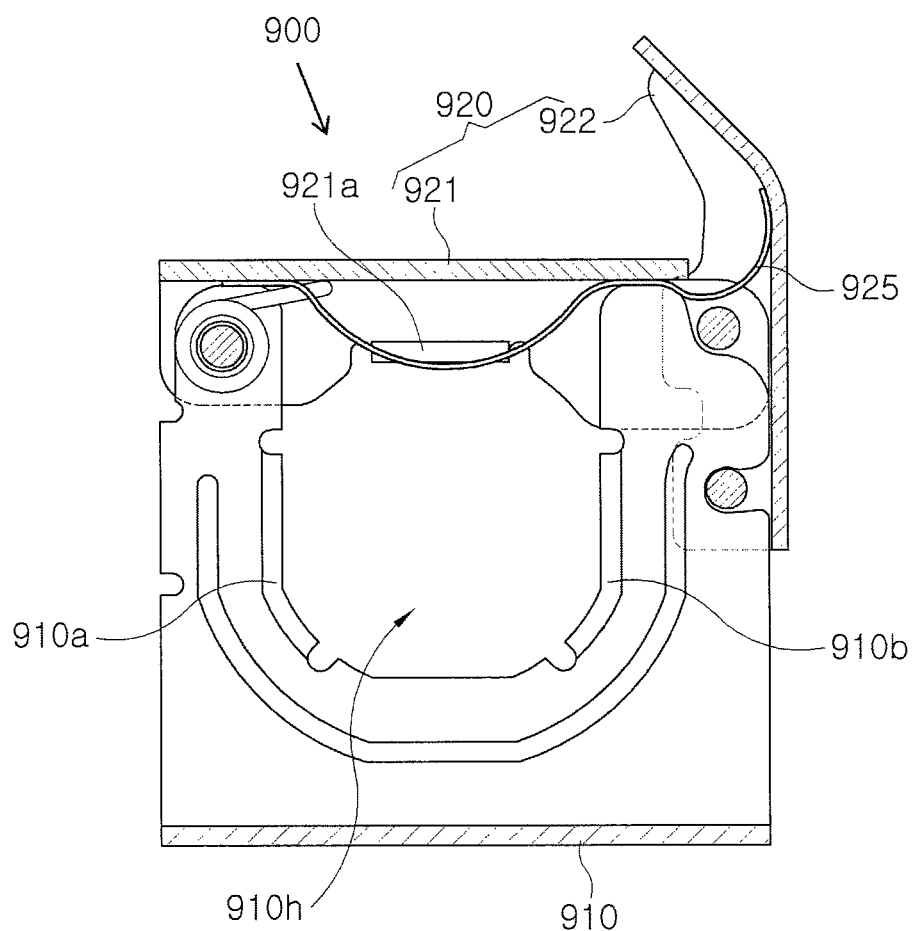
FIG. 10 is a view showing a bracket for fixing a reducer in a fire sprinkler according to a third embodiment of the present invention.

FIG. 10 is a view showing a bracket for fixing a reducer in a fire sprinkler according to a third embodiment of the present invention.

Referring to FIG. 10, there is shown a bracket 900 for fixing a reducer in a fire sprinkler according to the third embodiment of the present invention, and the basic structure thereof is the same as the bracket 300 for fixing a reducer in a fire sprinkler according to the first embodiment of the present invention, which has been described hereinbefore. However, there is a slight difference in the coupling means.

Accordingly, in describing the bracket 900 according to the third embodiment, the description of the same parts as the bracket 300 according to the first embodiment will be omitted, and only different parts will be described.

In other words, in the bracket 900 according to the third embodiment, a coupling part 920 includes: a first coupling member 921 rotatably coupled to a side of a main body part 910 by a hinge shaft; a second coupling member 922 rotatably coupled to a side of the first coupling member 921 by a hinge shaft; and an elastic member 925 provided throughout the first coupling member 921 and the second coupling member 922, and configured to provide an elastic force such that the first and second coupling members 921 and 922 are coupled with and released from the main body part 910 by a simple touch. Here, the elastic member 925 may be constituted by a leaf spring.

Figure 11:
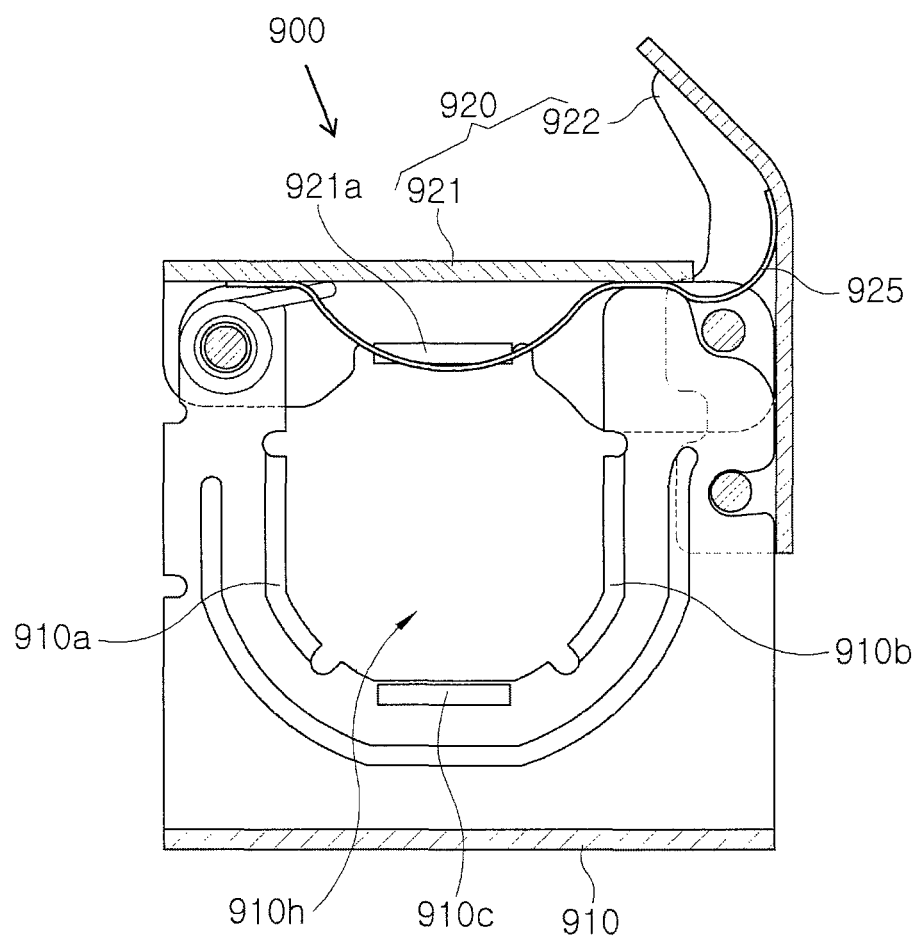
FIG. 11 is a view showing a state where a third wing is additionally provided between a pair of main body part wings symmetrical with each other in the bracket shown in FIG. 10.

FIG. 11 is a view showing a state where a third wing is additionally provided between a pair of symmetric main body part wings in the bracket shown in FIG. 10.

As shown in FIG. 11, in the case of the bracket 900 according to the third embodiment, as in the case of the brackets 300 and 800 according to the first and second embodiments, a third wing 910c may be additionally provided between a pair of symmetric main body part wings 910a and 910b, in order to increase a contact area with the reducer 620 (see FIG. 6) seated in a cutaway seat 910h. Reference numeral 921a in FIGS. 10 and 11 designates a coupling part wing.

As described above, the bracket for fixing a reducer in a fire sprinkler according to the present invention is advantageous in that the mechanism for fixing the reducer is not a bolt tightening type, but one-touch fixing mechanism such as a hook. Thus, it is easy to couple and release the reducer by taking measures to increase the contact area with the reducer, and it is possible to stably and firmly fix the reducer by obtaining a sufficient frictional force against the contact area with the reducer.

Although a preferred embodiment of the present invention has been described for illustrative purposes, those skilled in the art will appreciate that various modifications, additions and substitutions are possible, without departing from the scope and spirit of the invention. The scope of the invention is therefore to be determined solely by the appended claims.

What is claimed is:

1. A bracket for fixing a reducer in a fire sprinkler, the reducer being provided at an end of a flexible tube of the fire sprinkler, the bracket comprising:
   a main body part provided with a cutaway seat for allowing the reducer to be seated therein; and
   a coupling part openably coupled with the main body part, formed with a groove at a side thereof to lock the reducer seated in the cutaway seat of the main body part, and configured to lock and release the reducer seated in the cutaway seat of the main body part by being opened and closed,
   wherein an edge of the cutaway seat of the main body part is provided with a main body part wing to increase a contact area with the reducer seated in the cutaway seat, and
   an edge of the groove of the coupling part is provided with a coupling part wing to increase the contact area with the reducer.

2. The bracket of claim 1, wherein the main body part wing is configured such that an end portion thereof is bent to be inclined at a predetermined angle.

3. The bracket of claim 2, wherein the main body part wing is bent to be inclined at the predetermined angle, and is constituted by a pair of wings symmetrically provided to face each other.

4. The bracket of claim 3, further comprising:
   a third wing provided between the pair of wings symmetrically provided to face each other to increase the contact area with the reducer.

5. The bracket of claim 1, wherein the main body part is provided with a stop groove at a predetermined portion thereof to allow the coupling part to be coupled therewith and released therefrom.

6. The bracket of claim 5, wherein the coupling part includes:
   a first coupling member rotatably coupled to a side of the main body part by a hinge shaft; and
   a second coupling member rotatably coupled to a side of the first coupling member by a hinge shaft.

7. The bracket of claim 6, wherein the second coupling member is provided with a coupling means to be engaged with or released from the stop groove of the main body part.

8. The bracket of claim 7, wherein the coupling means is in a form of a steel wire spring.

9. The bracket of claim 7, wherein the coupling means is in a form of a steel leaf spring.

10. The bracket of claim 9, wherein the main body part wing is constituted by a pair of wings symmetrically provided to face each other, and a third wing is provided between the pair of symmetric main body part wings to increase the contact area with the reducer seated in the cutaway seat.

11. The bracket of claim 1, wherein the coupling part includes:
    a first coupling member rotatably coupled to a side of the main body part by a hinge shaft;
    a second coupling member rotatably coupled to a side of the first coupling member by a hinge shaft; and
    an elastic member provided throughout the first coupling member and the second coupling member, and configured to provide an elastic force such that the first and second coupling members are coupled with and released from the main body part by a simple touch.

12. The bracket of claim 11, wherein the elastic member is in a form of a leaf spring.

13. The bracket of claim 11, wherein the main body part wing is constituted by a pair of wings symmetrically provided to face each other, and a third wing is provided between the pair of symmetric main body part wings to increase the contact area with the reducer seated in the cutaway seat.

* * * * *